United States Patent
Thomas (10) Patent No.: US 9,354,104 B2
(45) Date of Patent: May 31, 2016

(54) REJECT BIN INTERLOCK SYSTEM AND METHOD OF SECURING OBJECTS REJECTED BY AN INSPECTION DEVICE

(71) Applicant: Mettler-Toledo, LLC, Columbus, OH (US)

(72) Inventor: Kyle Thomas, Lansing, NY (US)

(73) Assignee: METTLER-TOLEDO, LLC, Columbus, OH (US)

( * ) Notice: Subject to any disclaimer, the term of this patent is extended or adjusted under 35 U.S.C. 154(b) by 634 days.

(21) Appl. No.: 13/781,813

(22) Filed: Mar. 1, 2013

(65) Prior Publication Data
US 2014/0249767 A1    Sep. 4, 2014

(51) Int. Cl.
*G01G 15/00* (2006.01)
*G07C 9/00* (2006.01)

(52) U.S. Cl.
CPC .......... *G01G 15/006* (2013.01); *G07C 9/00174* (2013.01); *G07C 9/00896* (2013.01)

(58) Field of Classification Search
CPC ... G01G 15/00; G01G 15/006; G01G 15/007; G01G 13/00; G01G 13/003; G01G 13/006; G01G 13/02; G01G 13/026; G01G 11/00; G01G 11/003; G01G 11/02; G01G 11/04; G01G 11/046; G01G 11/0083; G01G 9/00; G07C 9/00174; G07C 9/00896
See application file for complete search history.

(56) References Cited

U.S. PATENT DOCUMENTS

| | | | |
|---|---|---|---|
| 4,676,432 A | 6/1987 | Wake | |
| 7,089,131 B2 | 8/2006 | Thouin et al. | |
| 2010/0101871 A1* | 4/2010 | Dale | G01G 15/006 177/1 |

* cited by examiner

*Primary Examiner* — Toan Le
(74) *Attorney, Agent, or Firm* — Standley Law Group LLP (57) ABSTRACT

A combination of a hardware-secured reject bin and a programmed controller that together function to create an interlock that limits access to a reject bin to only those users with specific access rights. Access is gained by entering a user ID or some other authorized reject bin user access information into the user interface of a checkweigher controller or another controller in communication with a checkweigher controller. Access attempts and events may be tracked and the removal of objects from an interlocked bin may be recorded to provide for improved object traceability.

30 Claims, 7 Drawing Sheets

EVENT LOG

REJECT BIN (#)

- ENTRY EVENT 1 – 09/01/2011; 9:05AM; USER ID: jdoe
- REJECT BIN SECURED 1 – 09/01/2011; 9:14AM
- REMOVED OBJECT COUNT 1 (entered) =13–09/01/2011; 9:12AM; USER ID: jdoe
- REMOVED OBJECT COUNT 1 (calculated) =13
- ACCESS DENIAL 1 – 09/01/2011; 3:05PM; USER ID: rsmith

REJECT BIN INTERLOCK SYSTEM AND METHOD OF SECURING OBJECTS REJECTED BY AN INSPECTION DEVICE

TECHNICAL FIELD

The present invention is directed to the secure retention of objects rejected by an inspection device, which may be a weighing device such as a checkweigher.

BACKGROUND

Various types of object inspection devices and techniques are known for inspecting analyzing, examining or otherwise confirming that a given object (e.g., product) conforms to some particular criterion. Such devices may include, without limitation, metal detectors, x-ray machines, cameras, lasers, scales and checkweighers. Object inspection may also occur in a wide variety of industries such as, to name a few, the food, chemical, and pharmaceutical industries.

The use of weighing devices such as checkweighers to weigh moving objects would be familiar to one of skill in the art, and various checkweigher designs exist for this purpose. Generally speaking, however, a checkweigher may be described as a high speed weighing device for the in-motion weighing of objects as the objects travel along a conveyor. A checkweigher is typically installed to a conveyor line such that an in-feed conveyor is provided for delivering objects to the checkweigher and a discharge conveyor is provided to transport objects from the checkweigher to a downstream location. The checkweigher itself also typically employs a conveyor to transport objects one at a time across a scale (weigh pan), which is essentially a vertically deflectable mechanism operable to effect weighing of the moving objects.

Typically, checkweighers are used to determine whether objects being weighed are of an expected weight, or within some acceptable range around an expected weight. If the weight of an object is deemed acceptable by a checkweigher, the object is normally passed to a downstream location, where the object may be further processed, packaged, etc. If the weight of an object is deemed unacceptable by a checkweigher, the object may be rejected. The rejection of an object for being of an unacceptable weight may result in a number of actions, which would be familiar to those of skill in the art. For example, an identifier (e.g., bar code) associated with a rejected object may be linked to a rejected status indicator, which may be used to prohibit some downstream action (e.g., packaging, shipping).

Another consequence of an object being rejected by a checkweigher for having an improper weight or by another inspection device for some other reason, and the consequence of interest to the present invention, is the physical removal of a rejected object from a discharge conveyor or other location downstream of the rejecting inspection device. For example, a number of rejection devices are known that may be activated upon receipt of a signal from an inspection device to selectively remove a defective (e.g., off-weight) object from a line of objects that have passed by, through or over the inspection device. Such a rejection device may be comprised of, for example, a linear actuator coupled to a pusher or other object engaging element, although virtually any device adapted to remove an object from a moving line of conveyed objects may be employed in conjunction with the present invention.

As should be apparent, it is normally desired that any object rejected by an inspection device be prevented from entering the stream of commerce. Rather, such objects may be destroyed, emptied and refilled, etc. Preferably, rejected objects may be quarantined until they can be retrieved for final disposition, such as by segregating the rejected objects in a reject bin or other suitable container or location.

Unfortunately, known reject bins and other devices provided to receive and retain objects rejected by an inspection device are either not secure in nature or, may be secure in nature but provide no mechanism for tracking the retrieval and disposition of the rejected objects contained therein. Therefore, rejected objects residing in such a reject bin may be easily removed and/or may be removed without any evidence indicating when the objects were removed, by whom the objects were removed, or to where the objects were removed. It is therefore possible for such rejected objects to be misplaced or to be inadvertently returned to a group of similar objects of proper weight and/or to otherwise make their way to an end-user.

It would, therefore, be desirable to provide a device for receiving and securely retaining objects rejected upon inspection. Preferably, such a device would limit access to only those persons to whom access has been specifically granted. Such a device may also log or otherwise record each entry thereto. Such a device may also be equipped with means for detecting the number of rejected objects present therein and the number of rejected objects removed therefrom during a given entry/removal event. The reject bin interlock invention provides for a device and method of securing objects rejected by an inspection device and of ensuring the traceability of objects received thereby and removed therefrom.

SUMMARY

The reject bin interlock invention is a combination of hardware and software that, together, functions to provide the desired results described above. From a hardware standpoint, the invention may employ a reject bin lid or door having a magnetic or electro-mechanical closure that functions to prevent unauthorized access to the reject bin. Such a closure may replace a more typical mechanical closure, such as a key-lock assembly. Such closures are known in the art and need not be described in detail herein.

Operation of the reject bin closure is preferably controlled by an inspection device with which the reject bin is associated, at least to the extent that a user desiring access to the reject bin would need to gain entry via the inspection device controller or a controller in communication with the inspection device controller. More specifically, operation of the reject bin closure is preferably controlled by the inspection device controller, such that a user must log in or otherwise access the reject bin through the controller. Alternatively, however, access to the reject bin may occur through another controller that is in communication with the inspection device controller for traceability purposes.

The controller used to access the reject bin may be provided with a special function allocation for controlling the reject bin closure. Only those users who have been granted reject bin access privileges may cause the reject bin to be opened via the inspection device controller or other controller. For example, a user may have a user ID that is associated with a stored user profile that includes access rights to the reject bin. Alternatively, a user may be provided with a password that grants access to the reject bin.

A user interface (UI) associated with the controller allows a user to enter reject bin user access information, e.g., an authorized user ID or password. Based on the information provided by the user, the controller will either deny access (and preferably log the action in a log file—see below) to the reject bin, or allow access to the reject bin (and preferably log the action in a log file—see below) by de-energizing, unlocking or otherwise releasing the magnetic or electro-mechanical closure. An "Access Reject Bin" soft-key, button or other suitable actuation mechanism with appropriate nomenclature may be provided on the controller UI for purposes of accessing the reject bin.

As discussed above, it is preferable that entries into the reject bin be tracked. To this end, each occurrence of the controller UI being used to access the reject bin would preferably be logged as an event in the controller log files, or in some other file storage location. Preferably, these event logs will include at least the time, date, and identification (ID) of the user attempting to access the reject bin. Other information may also be logged. After the reject bin is opened and the lid is subsequently re-closed and secured by re-energization of the closure mechanism, an additional event log file is preferably recorded. At least the date and time that the reject bin is closed and re-secured is preferably logged although, again, other information may also be recorded. In the case where the contents of the reject bin are also removed, an additional log file may be created.

In order to improve tracking/traceability of rejected objects, the user that accesses and removes rejected objects from the interlocked reject bin is preferably required to enter into the controller UI the number of rejected objects removed. In some embodiments, the number of rejected objects removed may need to be entered before the controller will allow the reject bin door to be re-secured by the closure and/or before further inspection device operation can occur. Entry of the number of rejected objects removed from the reject bin also preferably constitutes an event that is logged. The associated log file may again include the user ID, the time, the date and possibly other information. Log files associated with the reject bin interlock invention may be made available for reporting at various intervals such as, for example, at the end of a batch, interval, or production run, and may be stored for later retrieval.

More than one interlocked reject bin may be associated with a given inspection device according to the invention. In such a case, the access, emptying, re-securing and logging events would be repeated for each reject bin. A user having access rights to one of the interlocked reject bins may have access to all the interlocked reject bins associated with the inspection device. Alternatively, each interlocked reject bin, or groups of interlocked reject bins, may be assigned unique access rights such that users may have access to only certain ones of the reject bins. For example, a given interlocked reject bin may be associated with one or more specific products that will be weighed by a corresponding checkweigher. Consequently, access to a given interlocked reject bin may be limited to only those users having some association with or responsibility for the product(s) that may be rejected into said reject bin.

Preferably, reject bins associated with the reject bin interlock invention are provided with various sensors such as reject verify, bin full, and bin empty sensors. Bin empty sensors may be used in conjunction with a control interlock that would inhibit operation of the inspection device upon product changeover or batch termination until the bin is emptied of all remaining rejected products.

A reject countercheck (object removal cross-check), while not required, may also be employed. To this end, a reject bin associated with the reject bin interlock invention may be provided with a weighing device such as a scale, that can be used to determine the number of objects present in the reject bin. For example, the total weight of objects present in the reject bin, as determined by the scale, can be used in conjunction with the expected average weight per object of the rejected objects to calculate the total number of rejected objects present in the reject bin. A rejected objects counter may also be provided and placed into communication with the scale such that the scale will increment the counter each time another rejected object enters the reject bin.

The calculated total number of rejected objects present in the reject bin can be used as a countercheck against the number of rejected objects indicated as being removed by a user who has accessed the reject bin. Consequently, tracking/traceability of objects received by and removed from a reject bin may be improved according to the invention.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Exemplary embodiments of a reject bin interlock system and method of use according to the invention may be applied to a variety of different object inspection devices such as, but not limited to, the exemplary inspection devices mentioned above. In order to better illustrate the various aspects of the invention, exemplary embodiments of a reject bin interlock system and method are described below and depicted in the accompanying drawing figures as being used in conjunction with an inspection device in the form of a checkweigher. It is to be understood, however, that these exemplary embodiments are provided only for the purpose of illustration, and embodiments of the invention are not limited to use only with checkweighers.

Figure 1:
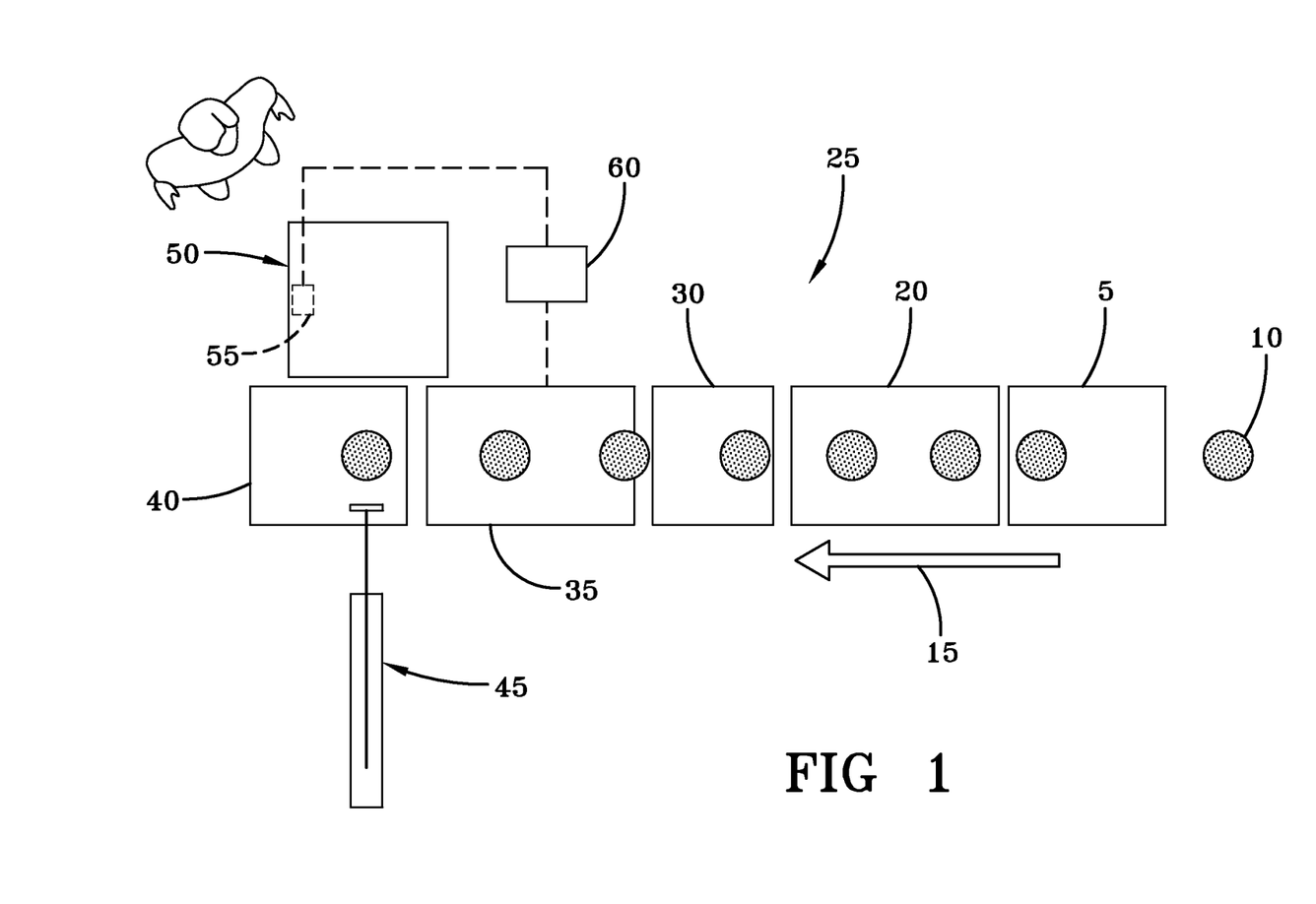
FIG. 1 schematically illustrates an exemplary inspection device in the form of a typical checkweigher that is equipped with an exemplary embodiment of a reject bin interlock system according to the invention.

One exemplary embodiment of a checkweigher system that may be associated with embodiments of the reject bin interlock invention is represented in FIG. 1. As shown, a supply conveyor 5 transports objects to be weighed 10 in the direction indicated by arrow 15. The objects 10 are moved onto an in-feed conveyor section 20 of a checkweigher 25, whereafter they are passed over a scale portion 30 of the checkweigher. After passing over the scale portion 30 of the checkweigher 25, the objects 10 are transported away from the checkweigher by an out-feed conveyor section 35 thereof. As would be familiar to one of skill in the art, the out-feed conveyor section 35 is generally associated with an exit conveyor 40 that will transport the objects 10 to a downstream location.

The checkweigher 25 determines whether each object 10 being weighed is of an expected weight or within some acceptable range around an expected weight, or if any of the objects being weighed are of an unacceptable weight (i.e., off-weight). If the weight of an object 10 is deemed acceptable by checkweigher 25, the object is passed to a downstream location by the out-feed and exit conveyors 35, 40.

If the weight of an object 10 is deemed unacceptable by the checkweigher 25 in this example, the object is rejected and a reject mechanism 45 physically removes the rejected object from a location downstream of the checkweigher. In this particular example, the reject mechanism 45 includes a linear actuator coupled to a pusher or other object engaging element, although other devices adapted to remove an object from a moving line of conveyed objects may be employed in conjunction with the invention.

The reject mechanism 45 removes the rejected object 10 from the downstream conveyor area and into an interlocked reject bin 50. The reject bin 50 is a closed container of some shape and size appropriate to receive and retain a number of rejected given objects 10. For example, the reject bin 50 may comprise a container of square, rectangular or round shape, having sidewalls or a sidewall joined to a bottom wall or to a floor so as to form a substantially hollow receptacle for receiving rejected objects. The reject bin 50 also includes a lid or cover that is secured to the sidewall(s) by a closure mechanism 55. As such, it should be understood that the reject mechanism 45 moves rejected objects into the reject bin 50 via a hole, slot, or other access aperture provided in the reject bin, the aperture preferably being of a nature that prohibits subsequent removal of objects from the reject bin therethrough by a user. As described above, the closure mechanism 55 is preferably a magnetic or electro-mechanical closure that may be locked and unlocked (secured and released) in response to an electrical signal from a controller or similar device.

During use, rejected objects deposited in the reject bin 50 may be removed at some regular or otherwise scheduled interval by causing an unlocking actuation of the closure and lifting the lid of the reject bin. Alternatively, such a reject bin 50 may be provided with one or more sensors that are adapted to indicate the need for the removal of some or all of the rejected objects deposited therein.

Access to the interlocked reject bin 50 of this exemplary embodiment is controlled by the checkweigher 25 with which the reject bin is associated. That is, in this particular example, operation of the reject bin closure mechanism 55 is controlled by the checkweigher controller 60, such that a user must gain access to the reject bin 50 through the checkweigher controller. In other embodiments, access to the reject bin may occur through a controller other than the checkweigher controller. In such a case, the other controller is preferably in communication with the checkweigher controller for traceability purposes.

In this exemplary embodiment, the checkweigher controller 60 is programmed for controlling the reject bin closure mechanism 55. For example, the UI of the checkweigher controller 60 (hereinafter the checkweigher UI) may be provided with a soft-key, button or similar actuation mechanism that may be engaged by a user for the purpose of accessing the reject bin 50.

Figure 2A:
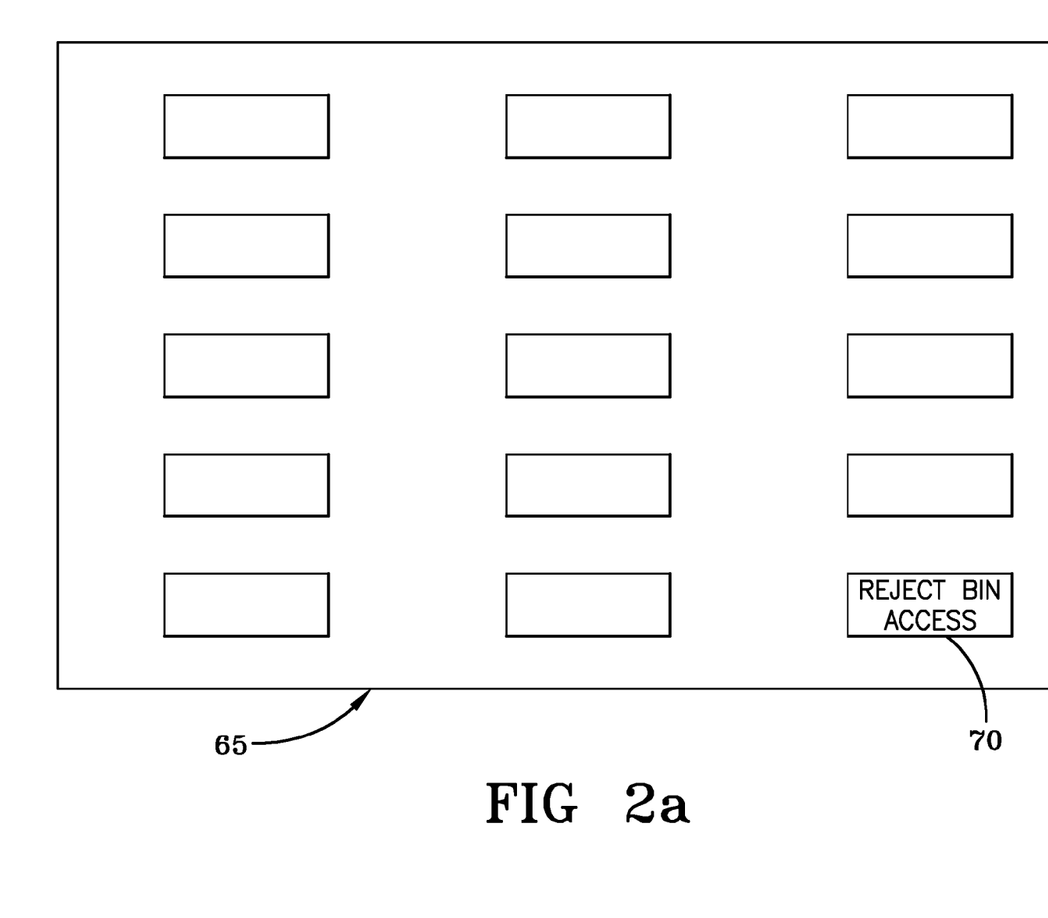
FIG. 2a depicts an exemplary user interface home screen of a checkweigher equipped in such a manner.

As shown in FIG. 2a, a home or other screen 65 of the checkweigher UI may display a reject bin access icon 70, or a reject bin access soft-key or button may be displayed elsewhere in the vicinity of the UI. Any such icon, soft-key or button may be provided with any appropriate nomenclature to indicate its function.

Figure 2B:
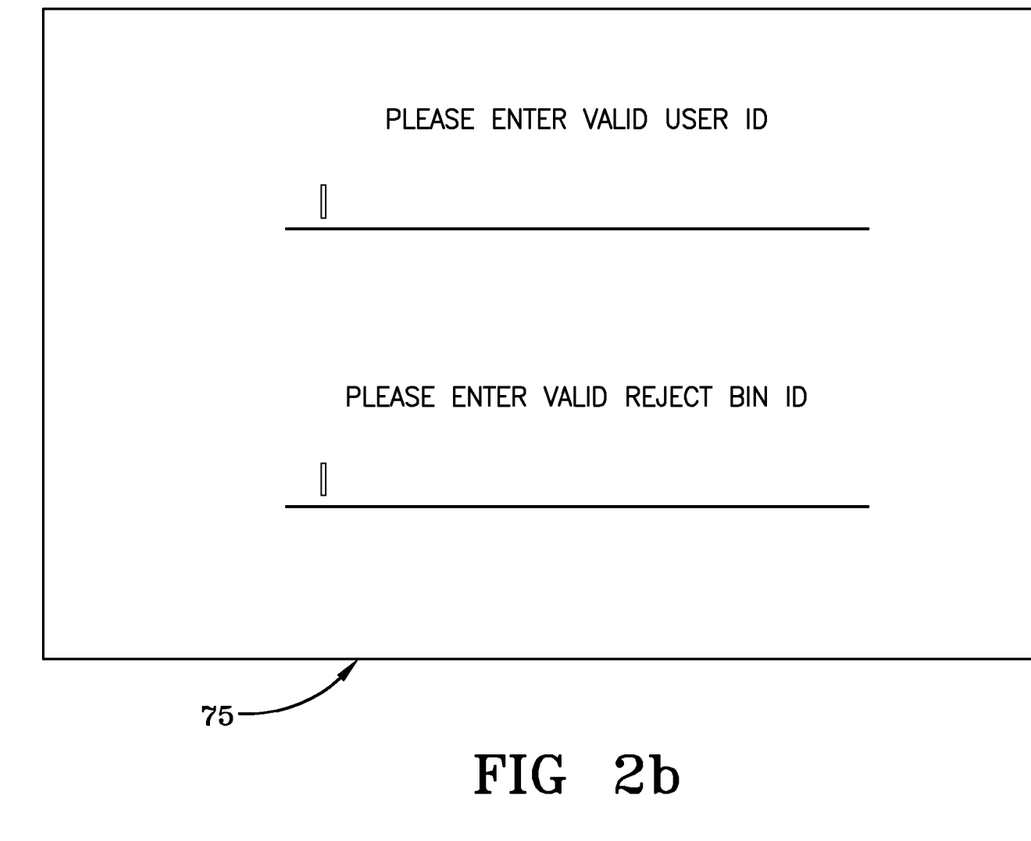
FIG. 2b depicts an exemplary reject bin user access information request screen of a checkweigher equipped in such a manner.

As represented in FIG. 2b, upon selection of the reject bin access icon 70, the checkweigher UI may then present a screen 75 that requires a user to input reject bin user access information before allowing the reject bin access operation to proceed. In this particular exemplary embodiment, the requested information is in the form of a user ID. Alternatively, a password or other information of some type may be requested, as long as the requested information can be used to determine if the user has reject bin access privileges.

Figure 2C:
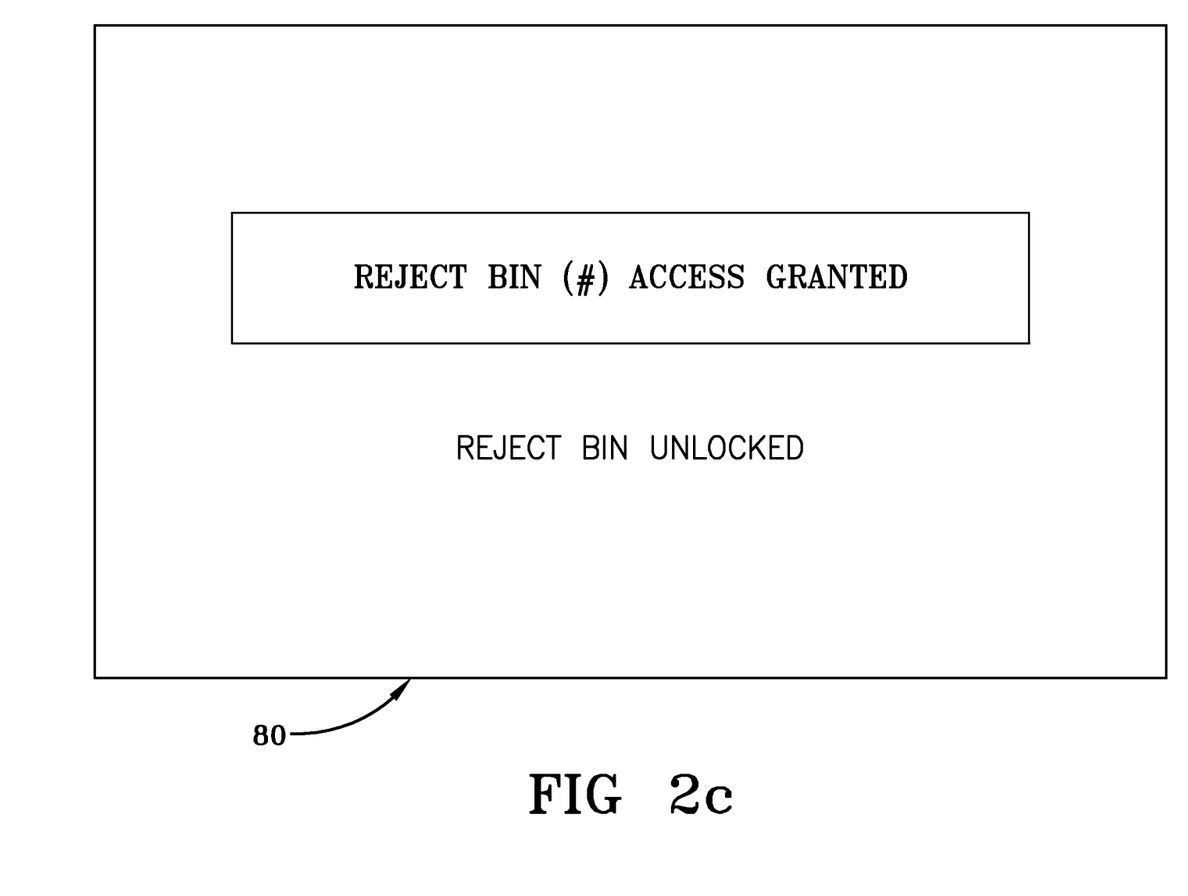
FIG. 2c depicts an exemplary access granted and/or reject bin unlocked user interface screen of a checkweigher equipped in such a manner.

As shown, the UI may also optionally request a reject bin ID—especially when multiple interlocked reject bins are present. In this example, entry of an acceptable user ID having corresponding reject bin access privileges may result in a new checkweigher UI screen 80 such as that represented in FIG. 2c, or in a message on the already existing screen indicating that access to the reject bin has been granted and/or that the reject bin closure mechanism has been released.

Figure 2D:
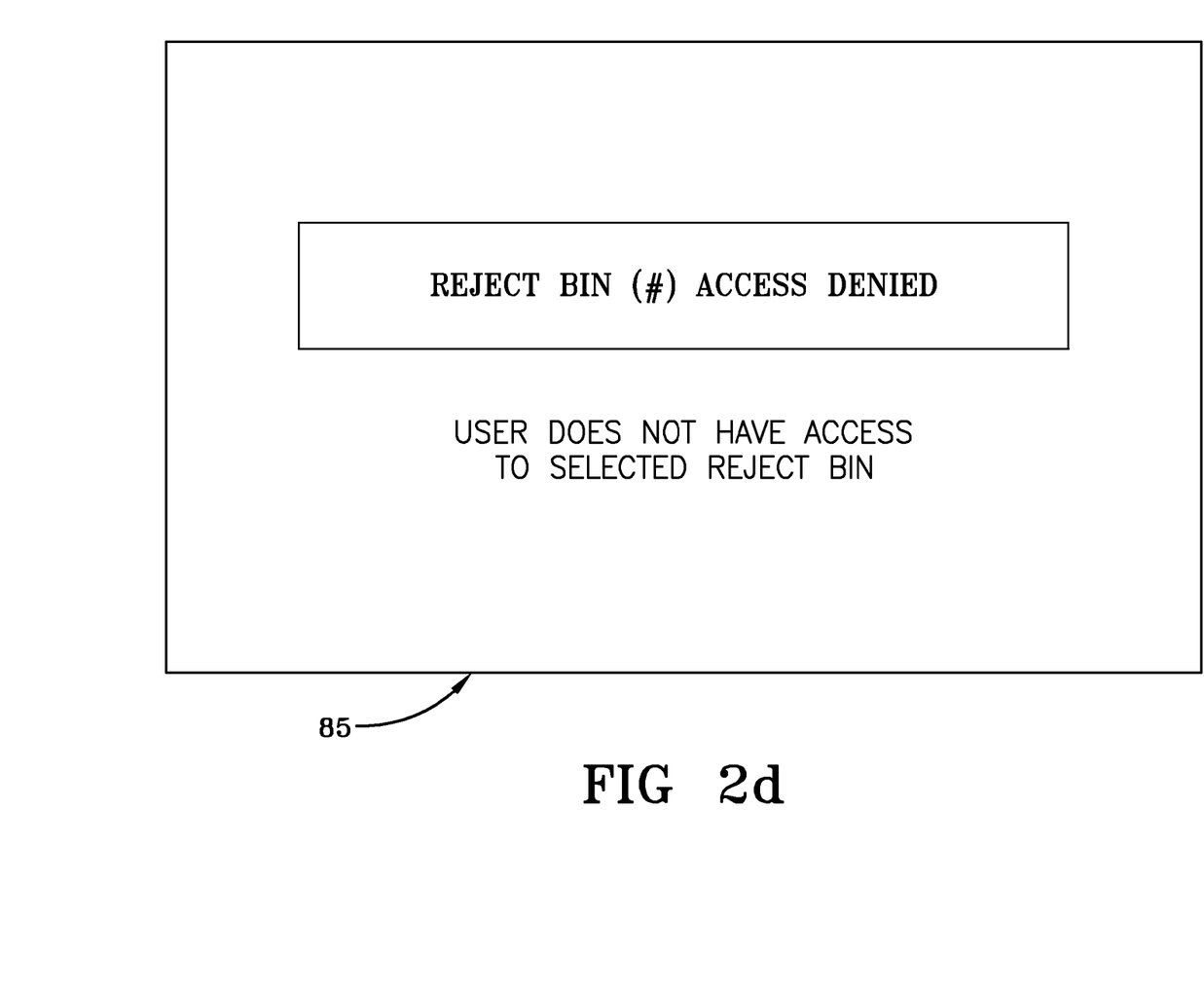
FIG. 2d depicts an exemplary access denied and/or no access rights user interface screen of a checkweigher equipped in such a manner.

Conversely, entry of a nonexistent user ID or a user ID not having corresponding reject bin access privileges may result, in this example, in a new checkweigher UI screen 85 such as that represented in FIG. 2d, or in a message on the already existing screen that access to the reject bin has been denied and/or that the user does not have access rights to the selected reject bin.

It is preferable that entries, or attempted entries, into an interlocked reject bin be tracked. Consequently, each time the checkweigher UI is used for the purpose of accessing a given reject bin, a log event is preferably generated. Such events may be recorded in the log files of the checkweigher controller or in various other file locations from which the log information may be subsequently displayed and/or retrieved. Preferably, the log events will include at least the time, date and identification (via user ID, unique password, etc.) of the user attempting to access a given reject bin. Other information may also be logged. Once an opened reject bin is closed and its lid is re-secured by the closure mechanism, such activity is also preferably logged. At least the date and time that the reject bin is closed and re-secured is preferably logged, although other information may also be recorded.

In order to improve tracking/traceability of rejected objects, a user that accesses and removes rejected objects from the reject bin is preferably required to enter into the checkweigher UI the number of rejected objects removed. This step may be optional or, conversely, this step may be mandatory. The controller may even be programmed to prohibit re-securing of the reject bin closure mechanism and/or further operation of the checkweigher until the number of rejected objects removed is entered. Entry of the number of rejected objects removed from the reject bin also preferably constitutes an event that is logged. The associated log file may again include the user ID, the time, the date and possibly other information. Alternatively, the associated log file may include only the number of rejected objects stated to have been removed by the user.

A reject countercheck (removed object count cross-check), may be a part of the reject bin interlock invention. In such a case, a reject bin associated with the reject bin interlock invention may be provided with a weighing device 90 such as a scale (see FIG. 3), that can be used to determine the total weight of objects present in the reject bin. The total weight of objects present in the reject bin can be used in conjunction with the expected average weight per object of the particular rejected objects to calculate the total number of rejected objects present in the reject bin. For example, the checkweigher controller 60 may be programmed appropriately to make such calculations based on weight information received from the weighing device 90. The calculated total number of rejected objects present in the reject bin, both before and after an entry and subsequent re-closing event, can be used as a cross-check against the number of rejected objects indicated as being removed from the reject bin by a user who has accessed the reject bin. Consequently, tracking/traceability of objects received by an removed from an interlocked reject bin may be improved according to the reject bin interlock invention.

Figure 3:
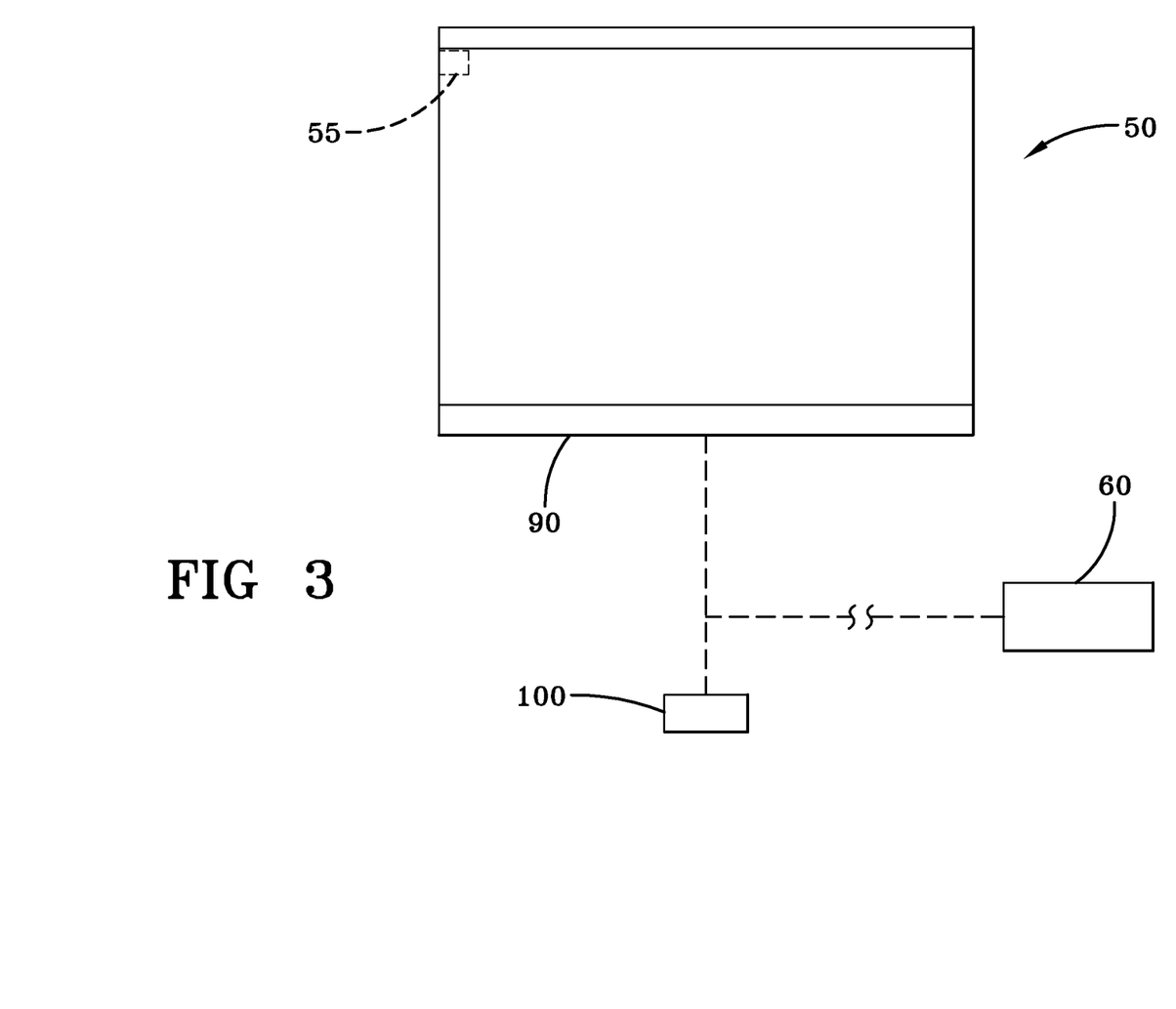
FIG. 3 represents an exemplary reject bin of the invention equipped with a rejected object removal countercheck mechanism.

A rejected objects counter 100 may also be provided to count the total number of rejected objects deposited to a given reject bin. Such a counter may be placed into communication with the weighing device 90 such that the weighing device will cause an increment of the counter each time a rejected object enters the reject bin. To simplify the counting operation, the weighing device 90 may be adapted to automatically re-tare itself after each occasion that another rejected object is added to the reject bin. This allows the scale 90 to simply increment the counter 100 each time an increase in weight is detected. Alternatively, the scale 90 may be provided with the expected weight of an object currently being processed by an associated checkweigher such that the scale will only increment the counter 100 when a change in the total weight of objects in the reject bin or a new weight reading observed after a re-tare is within some range of an expected weight increase resulting from the addition of a new rejected object to the reject bin.

In any case, data from the rejected objects counter 100 may also be used in a cross-check capacity. For example, a rejected objects count value from the counter 100 may be logged, reported, etc., to the controller 60 such that the number of objects actually removed from the reject bin and/or reported as being removed from the reject bin can be checked against the rejected objects counter value in a subsequent verification operation. When both techniques are employed, the rejected objects count value from the counter 100 may also be used as a cross-check against the calculated total number of rejected objects present in a reject bin as determined by the controller 60.

Figure 4:
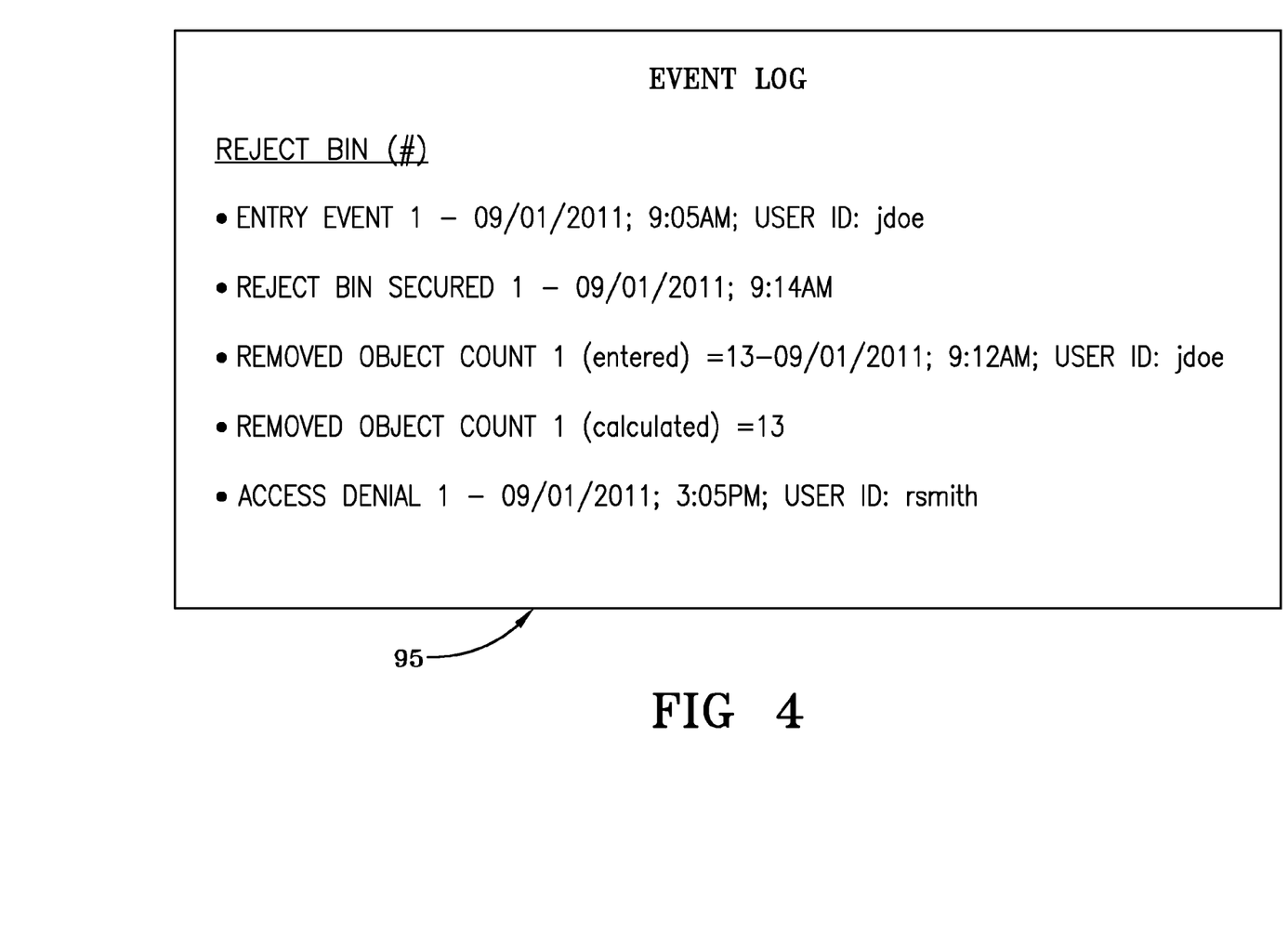
FIG. 4 depicts an exemplary event log that may be associated with the reject bin interlock invention.

FIG. 4 represents one illustrative and non-limiting example of a possible event log screen 95 that may be associated with the reject bin interlock invention. As shown, such an event log may permit a user to review various activity associated with a given reject bin. In this particular example, the date, time, and user ID associated with an entry into the reject bin is displayed, as is the date and time that the reject bin was closed and re-secured. This exemplary event log also includes a count of the number of rejected items removed as entered by a user, as well as a count of the number of rejected items removed as calculated by the checkweigher controller (i.e., according to the removed object cross-check function). The exemplary event log further displays an access denial event where access to the interlocked reject bin was denied based on the entry of a non-authorized user ID.

More than one interlocked reject bin may be associated with a given checkweigher according to the reject bin interlock invention. In such a case, the access, emptying, re-closing/re-securing and logging events would be repeated for each reject bin. A user having access rights to one of the reject bins may have access rights to all the interlocked reject bins associated with the checkweigher. Alternatively, each interlocked reject bin, or groups of interlocked reject bins, may be assigned unique access rights such that users may have access to only certain ones of the reject bins. For example, a given reject bin may be associated with one or more specific products that will be weighed by a corresponding checkweigher. Consequently, access to a given reject bin may be limited to only those users having some association with or responsibility for the product(s) that may be rejected into said reject bin.

Alternative embodiments and applications of a reject bin interlock system other than those shown and described herein are also possible. For example, while exemplary reject bin interlock system embodiments are described herein as being used only with an inspection device such as a checkweigher, it is also possible to use such systems in other applications where objects are rejected on some basis and it is desired to sequester such objects in a secure manner. Therefore, while certain embodiments of the present invention are described in detail above, the scope of the invention is not to be considered limited by such disclosure, and modifications are possible without departing from the spirit of the invention as evidenced by the following claims:

What is claimed is:

1. A reject bin interlock system for use with an object inspection device, comprising:
    an interlocked reject bin in the form of a secure enclosure associated with and adapted to receive objects designated as rejected by the object inspection device;
    a closure mechanism adapted to securely retain a lid of the reject bin in a closed position until the closure mechanism is deliberately released;
    a programmable controller in communication with the closure mechanism and adapted to release and secure the closure mechanism by transmission of an appropriate electrical signal thereto after receipt of authorized reject bin user access information; and
    a user interface in association with the programmable controller, the user interface adapted to permit the input of reject bin user access information to the programmable controller.

2. The reject bin interlock system of claim 1, wherein the closure mechanism is selected from the group consisting of a magnetic device and an electro-mechanical device.

3. The reject bin interlock system of claim 1, wherein the programmable controller is selected from the group consisting of a controller of the object inspection device with which the interlocked reject bin is associated and a separate controller in communication with the controller of the object inspection device with which the interlocked reject bin is associated.

4. The reject bin interlock system of claim 1, wherein the user interface is adapted to request information from a user, the information of a type selected from the group consisting of reject bin user access information in the form of a user ID or a password, a reject bin ID, and a number of objects removed from the reject bin after the reject bin has been accessed.

5. The reject bin interlock system of claim 1, further comprising a scale located in or under the reject bin, the scale in communication with the programmable controller.

6. The reject bin interlock system of claim 5, wherein the programmable controller is programmed to calculate the number of objects removed from the reject bin after the reject bin has been accessed, by dividing the total weight of objects deposited in the reject bin as determined by the scale, by an average weight per object value provided to the programmable controller for a given object.

7. The reject bin interlock system of claim 5, further comprising a rejected object counter in communication with the scale, the scale adapted to increment the rejected object counter each time a weight increase is observed by the scale as a result of another object being added to the reject bin.

8. The reject bin interlock system of claim 7, wherein the scale is adapted to perform a re-tare operation after each increment of the rejected object counter.

9. The reject bin interlock system of claim 1, wherein a plurality of interlocked reject bins are associated with a given inspection device.

10. The reject bin interlock system of claim 9, wherein a user granted access to one of the plurality of interlocked reject bins is granted access to all of the plurality of interlocked reject bins.

11. The reject bin interlock system of claim 9, wherein a given user is granted access to only one or certain ones of the plurality of interlocked reject bins.

12. The reject bin interlock system of claim 1, wherein the object inspection device is a checkweigher.

13. A reject bin interlock system for use with a checkweigher, comprising:
    an interlocked reject bin in the form of a secure enclosure that is associated with the checkweigher and adapted to receive objects designated as rejected by the checkweigher;
    a closure mechanism adapted to securely retain a lid of the reject bin in a closed position until the closure mechanism is deliberately released;
    a programmable controller in communication with the closure mechanism and adapted to release and secure the closure mechanism by transmission of an appropriate electrical signal thereto after receipt of authorized reject bin user access information;
    a user interface in association with the programmable controller, the user interface adapted to permit the input of reject bin user access information to the programmable controller; and
    a scale located in or under the reject bin, the scale in communication with the programmable controller.

14. The reject bin interlock system of claim 13, wherein the closure mechanism is selected from the group consisting of a magnetic device and an electro-mechanical device.

15. The reject bin interlock system of claim 13, wherein the programmable controller is selected from the group consisting of a controller of the checkweigher with which the interlocked reject bin is associated and a separate controller in communication with the controller of the checkweigher with which the interlocked reject bin is associated.

16. The reject bin interlock system of claim 13, wherein the programmable controller is programmed to calculate the number of objects removed from the reject bin after the reject bin has been accessed, by dividing the total weight of objects deposited in the reject bin as determined by the scale by an average weight per object value provided to the programmable controller for a given object.

17. The reject bin interlock system of claim 13, further comprising a rejected object counter in communication with the scale, the scale adapted to increment the rejected object counter each time a weight increase is observed by the scale as a result of another object being added to the reject bin.

18. A method of securing objects rejected by an object inspection device, comprising:
    providing an interlocked reject bin in the form of a secure enclosure, the reject bin associated with and adapted to receive objects designated as rejected by the object inspection device;
    providing a closure mechanism adapted to securely retain a lid of the reject bin in a closed position until the closure mechanism is deliberately released;
    placing a programmable controller in communication with the closure mechanism, the programmable controller adapted to release and secure the closure mechanism by transmission of an appropriate electrical signal thereto after receipt of authorized reject bin user access information;
    providing a user interface for inputting reject bin user access information to the programmable controller;
    causing one or more objects rejected by the object inspection device to be deposited in the reject bin;
    requiring a user to input reject bin user access information into the programmable controller via the user interface in order to access the reject bin; and
    granting the user access to the reject bin by using the programmable controller to send a signal that releases the closure mechanism on the reject bin, only when entered reject bin user access information is determined to be indicative of a user having reject bin access privileges.

19. The method of claim 18, wherein the user access information is in the form of a user ID or a password.

20. The method of claim 18, wherein a user is also required to provide a reject bin ID as part of the reject bin user access information input process.

21. The method of claim 18, wherein, after the reject bin has been accessed, a user is required to enter the number of objects removed from the reject bin before the reject bin closure mechanism can be re-secured by the programmable controller.

22. The method of claim 18, further comprising locating a scale in or under the reject bin, the scale in communication with the programmable controller.

23. The method of claim 22, wherein the programmable controller calculates the number of objects removed from the reject bin after the reject bin has been accessed, by dividing the total weight of objects deposited in the reject bin as determined by the scale by an average weight per object value provided to the programmable controller for a given object.

24. The method of claim 23, wherein a user is required to input the number of objects removed from the reject bin after the reject bin has been accessed, and the number of objects removed from the reject bin as calculated by the controller is used as a cross-check against the number of objects removed from the reject bin as input by the user.

25. The method of claim 18, wherein the programmable controller generates an event log entry any time access to an interlocked reject bin is attempted via the user interface.

26. The method of claim 25, wherein a given event log entry includes information selected from the group consisting of user ID, password, access attempt date, access attempt time, access granted or denied status, reject bin secured time, and removed object count as entered by user.

27. The method of claim 18, wherein a plurality of interlocked reject bins are associated with a given object inspection device.

28. The method of claim 27, wherein granting a given user access to one of the plurality of interlocked reject bins grants the user access to all of the plurality of interlocked reject bins.

29. The method of claim 27, wherein a given user is granted access to only one or certain ones of the plurality of interlocked reject bins.

30. The method of claim 18, wherein the object inspection device is a checkweigher.

\* \* \* \* \*